United States Patent
Magazzini et al.

(10) Patent No.: US 10,647,183 B2
(45) Date of Patent: May 12, 2020

(54) VEHICLE CLOSURE PANEL ASSEMBLY AND CARRIER ASSEMBLY THEREFOR

(71) Applicant: Magna Closures Inc., Newmarket (CA)

(72) Inventors: Mario Magazzini, Leghorn (IT); Francesco Cumbo, Pisa (IT)

(73) Assignee: MAGNA CLOSURES INC., Newmarket (CA)

( * ) Notice: Subject to any disclaimer, the term of this patent is extended or adjusted under 35 U.S.C. 154(b) by 177 days.

(21) Appl. No.: 15/990,912

(22) Filed: May 29, 2018

(65) Prior Publication Data

US 2018/0345765 A1 Dec. 6, 2018

Related U.S. Application Data

(60) Provisional application No. 62/514,311, filed on Jun. 2, 2017.

(51) Int. Cl.
| | |
|---|---|
| *B62D 25/04* | (2006.01) |
| *B60J 5/04* | (2006.01) |
| *E05B 81/24* | (2014.01) |
| *E05B 79/02* | (2014.01) |
| *E05B 79/04* | (2014.01) |
| *E05B 81/20* | (2014.01) |

(52) U.S. Cl.
CPC ............. *B60J 5/0468* (2013.01); *E05B 79/02* (2013.01); *E05B 79/04* (2013.01); *E05B 81/25* (2013.01); *B60Y 2306/09* (2013.01); *B60Y 2410/113* (2013.01); *E05B 81/20* (2013.01)

(58) Field of Classification Search
CPC .... Y10T 29/49826; B60G 7/001; B60N 2/64; B60N 2/68; B60N 2/682

USPC ........................................................ 296/146.5
See application file for complete search history.

(56) References Cited

U.S. PATENT DOCUMENTS

| | | | |
|---|---|---|---|
| 6,449,907 B2 * | 9/2002 | Nishikawa ............. | B60J 5/0416 296/146.7 |
| 6,892,496 B1 * | 5/2005 | Youngs .................. | B60J 5/0416 49/502 |
| 8,763,308 B2 | 7/2014 | Roy et al. | |
| 9,333,837 B2 | 5/2016 | Broadhead et al. | |
| 2003/0009948 A1 * | 1/2003 | Nishikawa ............. | E05F 11/485 49/502 |
| 2003/0097798 A1 * | 5/2003 | Staser .................... | B60J 5/0416 49/502 |
| 2003/0218356 A1 * | 11/2003 | Emerling ............... | B60J 5/0406 296/146.1 |
| 2004/0155483 A1 * | 8/2004 | Lin ........................ | B60J 5/0416 296/146.1 |

(Continued)

*Primary Examiner* — Kiran B Patel
(74) *Attorney, Agent, or Firm* — Dickinson Wright PLLC

(57) ABSTRACT

A vehicle panel assembly for a motor vehicle and carrier module therefor are provided. The vehicle body panel assembly includes a structural panel body defining an internal cavity with the carrier module secured to the structural panel body at least partially in the internal cavity. The carrier module has a carrier with an actuator attachment region integrally formed thereon and providing a first attachment feature. A latch assembly is secured to the carrier module and an actuator is configured in operable communication with the latch assembly to selectively cinch the latch assembly. The actuator has a housing providing a second attachment feature, wherein the first and second attachment features are configured for attachment to one another.

20 Claims, 8 Drawing Sheets

(56) References Cited

U.S. PATENT DOCUMENTS

| | | | |
|---|---|---|---|
| 2008/0276541 A1* | 11/2008 | Roy | B60J 5/0416 49/502 |
| 2010/0146862 A1* | 6/2010 | Lin | B60J 5/0416 49/502 |
| 2011/0303503 A1* | 12/2011 | Merlette | B60J 5/0418 188/378 |
| 2014/0208656 A1* | 7/2014 | Fortin | B60J 5/06 49/449 |
| 2016/0060922 A1 | 3/2016 | Clark et al. | |
| 2016/0230426 A1* | 8/2016 | Taurasi | E05B 77/34 |
| 2017/0114575 A1* | 4/2017 | Cumbo | E05B 77/06 |
| 2018/0016811 A1* | 1/2018 | Magazzini | B60J 5/0413 |
| 2018/0355642 A1* | 12/2018 | Cumbo | E05B 77/30 |
| 2019/0017298 A1* | 1/2019 | Sardelli | E05B 77/34 |
| 2019/0078366 A1* | 3/2019 | Lu | B60J 5/0418 |
| 2019/0153768 A1* | 5/2019 | Termine | E05F 15/622 |

* cited by examiner

VEHICLE CLOSURE PANEL ASSEMBLY AND CARRIER ASSEMBLY THEREFOR

CROSS-REFERENCE TO RELATED APPLICATION

This application claims the benefit of U.S. Provisional Application Ser. No. 62/514,311, filed Jun. 2, 2017, which is incorporated herein by reference in its entirety.

FIELD

The present disclosure relates generally to vehicle closure panel assemblies, and more particularly to carrier assemblies therefor having an actuator configured to cinch a latch of a closure panel.

BACKGROUND

This section provides background information related to vehicle closure panels and carrier assemblies therefor to provide a better understanding of currently available configurations and adaptations of such vehicle doors and carrier assemblies. However, the information provided in this section is not necessarily considered to be prior art with respect to the inventive concepts associated with the present disclosure.

Actuators are often used in automotive vehicles to cinch a latch of a vehicle closure panel. Such actuators typically include a motor and gear assembly operably coupled to the latch via a cable or rod. Commonly, the motor and gear assembly of the actuator generate undesirable noise and vibration, and thus, the actuator is typically mounted to a carrier of the closure panel via rubber mount members. The rubber mount members are typically fixed in through openings formed in the carrier, and then the actuator is subsequently fixed to the rubber mount members. Although the rubber mount members can prove effective at dampening noise and vibration, they come with some potential drawbacks.

Some drawbacks of fixing an actuator to a carrier via rubber mounts include added cost, both from a material standpoint, by having to purchase and stock the separate rubber mounts, and an assembly/labor standpoint, by having to perform added processes to first fix the rubber mounts to the carrier and then fix the actuator to the rubber mounts. Additionally, by having to form through openings in the carrier to attach the rubber mounts to the carrier, a potential source of water leak from a "wet-side" of the carrier (facing the outside environment) to a "dry-side" of the carrier (facing an interior of the vehicle) is inherently established. Any water leak through the openings in the carrier can prove detrimental to electronic components of the closure panel, which are typically mounted on the dry-side, and can further cause unsightly damage to an interior decorative panel the vehicle.

Thus, for at least those reasons discussed above, a need exists to develop optimized closure panel assemblies and actuator/carrier assemblies therefor.

SUMMARY

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

In one aspect, the present disclosure is directed to a vehicle closure panel and a carrier assembly for the vehicle closure panel which advances the art and improves upon currently known vehicle closure panels and carrier assemblies for such vehicle closure panels.

In another aspect, the present disclosure is directed to a vehicle door and a carrier assembly for the vehicle door which advances the art and improves upon currently known vehicle doors and carrier assemblies for such vehicle doors.

It is a related aspect to provide a carrier assembly equipped with an actuator configured to cinch a latch that facilitates attachment of the actuator to a carrier of the assembly in reliable, economical fashion.

It is a related aspect to provide a carrier assembly equipped with an actuator configured to cinch a latch that reduces the number of components and processes required for fixation of the actuator to a carrier of the assembly.

It is a related aspect to provide a carrier assembly equipped with an actuator configured to cinch a latch that eliminates the need to form a through opening in a carrier of the assembly for attachment of the actuator thereto, thereby eliminating a potential source of water leak through the carrier.

It is a related aspect to provide a carrier assembly including a carrier having an integral attachment region providing a first attachment feature and an actuator having a housing with a second attachment feature, wherein the first and second attachment features are configured for attachment to one another to form a quick, watertight, leak-proof, economical and reliable connection and wherein the actuator is configured to cinch a latch of a closure panel.

It is a related aspect to provide the carrier and first attachment feature as a molded piece of monolithic material.

It is a related aspect to provide a vehicle panel assembly for a motor vehicle. The vehicle panel assembly includes a structural panel body defining an internal cavity with a carrier assembly secured to the structural panel body at least in part in the internal cavity. The carrier assembly has a carrier with an integral actuator attachment region providing a first attachment feature. A latch is secured to the carrier assembly and an actuator is configured in operable communication with the latch to cinch the latch. The actuator has a housing providing a second attachment feature, wherein the first and second attachment features are configured for attachment to one another.

In accordance with another aspect of the disclosure, the first and second attachment features can be configured for interlocking engagement with one another.

In accordance with another aspect of the disclosure, the first and second attachment features can be configured for snapping engagement with one another.

In accordance with another aspect of the disclosure, one of the first and second attachment features can be provided as a male member and the other of the first and second attachment features can be provided a female member, with the male and female members being configured to slide into snapping and releasably locked engagement with one another.

In accordance with another aspect of the disclosure, the first and second attachment features can be formed integrally, as a single piece of material, with the carrier and actuator housing, respectively, thereby reducing the number of component parts needed in assembly and reducing the process steps need to form the carrier and actuator housing.

In accordance with another aspect of the disclosure, the first and second attachment features can be formed in imperforate or substantially imperforate regions of the carrier and actuator housing, respectively, thereby negating potential sources of leak.

In accordance with another aspect of the disclosure, the first and second attachment features can be configured for a snug fit with one another to negate a potential source of noise and vibration.

In accordance with another aspect of the disclosure, the male member can be provided with a receptacle and the female member can be provided with a resilient tongue, wherein the resilient tongue is configured for snapping, releasably locked receipt in the receptacle to prevent relative sliding movement between the male and female members upon attaching the male and female members to one another.

In accordance with another aspect of the disclosure, the male and female members can be configured for sliding movement relative to one another along a first direction and the resilient tongue can be configured for resilient pivoting movement along a second direction, wherein the first and second directions are generally transverse to one another.

In accordance with another aspect of the disclosure, the housing can provide at least two second attachment features, the carrier can provide at least two first attachment features, wherein the at least two first attachment features are configured for attachment to the respective at least two second attachment features.

In accordance with another aspect of the disclosure, the at least two second attachment features of the housing can be configured in side-by-side relation with one another and the at least two first attachment features of the carrier can be configured in side-by-side relation with one another, In accordance with another aspect of the disclosure, the structural body panel can be provided as a vehicle door that is at least one of a pivoting door and/or a sliding door.

Further areas of applicability will become apparent from the description provided herein. As noted, the description and any specific examples in this summary are intended for purposes of illustration only and are not intended to limit the scope of the present disclosure.

BRIEF DESCRIPTION OF THE DRAWINGS

Other advantages of the present embodiments will be readily appreciated, as the same becomes better understood by reference to the following detailed description and appended claims when considered in connection with the accompanying drawings, wherein:

DETAILED DESCRIPTION OF EXAMPLE EMBODIMENTS

Figure 1:
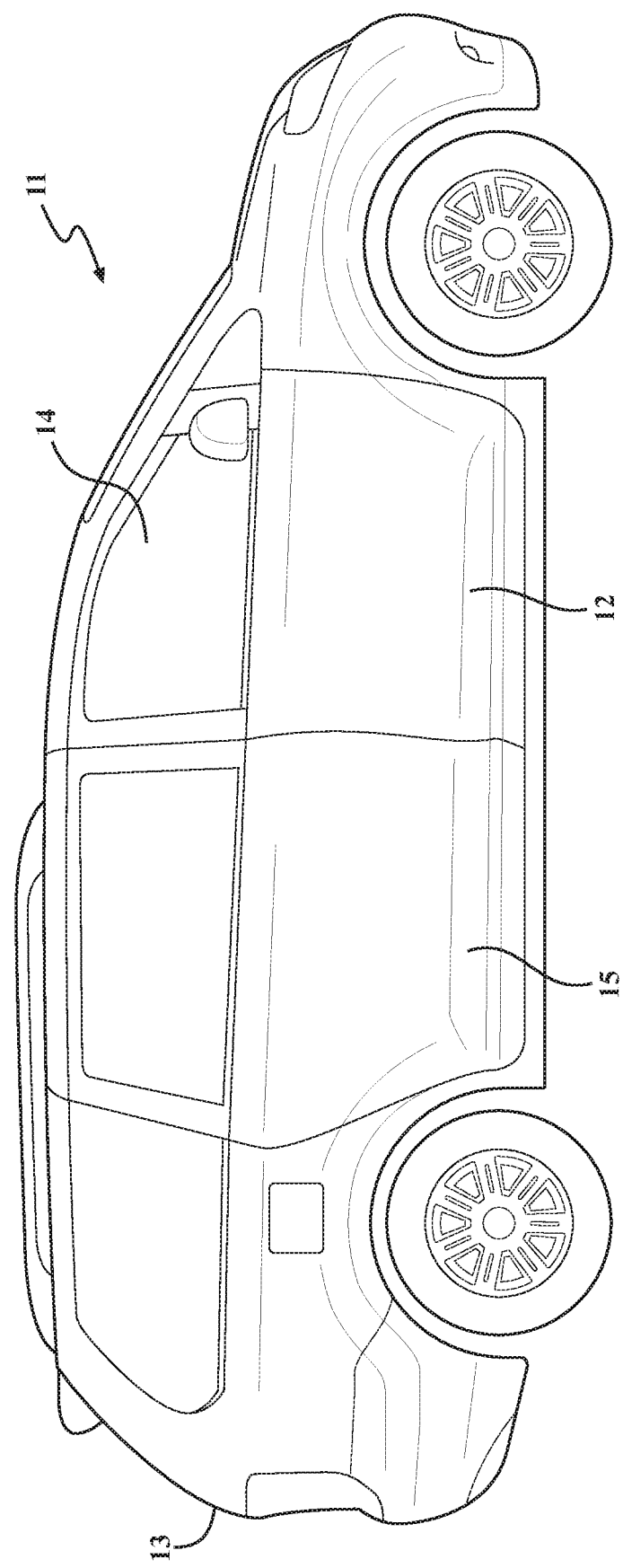
FIG. 1 illustrates a vehicle having at least one panel assembly constructed in accordance with one aspect of the disclosure.

The example embodiments will now be described more fully with reference to the accompanying drawings.

One or more example embodiments of a door module for a vehicle door are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 shows a vehicle 11 having a plurality of closure panel assemblies, including front door panel assemblies 12, a rear hatch lift gate closure panel assembly 13, at least one sliding side door panel assembly 15, wherein one or more of the panel assemblies can include a door module, also referred to as carrier module or carrier assembly 10 (FIGS. 2-4), constructed in accordance with one aspect of the disclosure. The carrier assembly 10 includes a carrier 16 and an actuator 21 configured in operable communication with a latch assembly 30 via a rod or cable, such as a Bowden cable 24, to selectively cinch the latch assembly 30. The actuator 21 is releasably attached to the carrier 16 in a fashion that results in a reliable attachment that is quick and easy to establish, economical in manufacture and in assembly, and watertight. While the actuator 21 is illustrated herein as being "releasably" attached, such that the actuator 21 can be selectively detached, or removed, from the carrier 16, in the event of a repair or upgrade for example, in accordance with another embodiment, the actuator 21 may be attached to the carrier 16 in a permanent manner, if desired, that is without the option of being removed from the carrier 16 once it has been attached thereto.

In accordance with an embodiment, the actuator 21 is releasably attached to the carrier 16 at an imperforate or substantially imperforate actuator attachment region 17. The term "substantially imperforate" refers to the absence of through openings or holes, or wherein adequately sealed through openings or holes may exist, for example, in the carrier 16, wherein the sealed through opening or holes are remote from and away from the attachment region 17 (attachment region 17 is illustratively shown in FIG. 3 as being located proximate the bottom, laterally intermediate portion of the carrier 16, but other localizations for the attachment regions may easily be provided, as desired). Accordingly, a leak from the "wet-side" of the carrier 16 (facing the outside environment) to the "dry-side" of the carrier 16 (facing an interior of the vehicle) is prevented about the actuator 21. Accordingly, in some instances holes or openings may be provided in the carrier 16 for providing passages for cables, or wires or the like, wherein the holes or openings are sufficiently sealed to prevent or inhibit water ingress such that water is prevented or inhibited from leaking from the "wet-side" of the carrier (facing the outside environment) to the "dry-side" of the carrier. However, as discussed above, any holes or openings are not within the attachment region 17. Accordingly, it is contemplated herein that openings are not needed nor are they desired in the attachment region 17, thereby negating potential sources of leak. Accordingly, there may be provided a carrier 16 with an actuator attachment region 17 formed integrally thereon, the actuator attachment region 17 providing a first attachment feature 62 not requiring through openings or holes in the carrier 16 for mounting the actuator 16 to the carrier 16.

Figure 2:
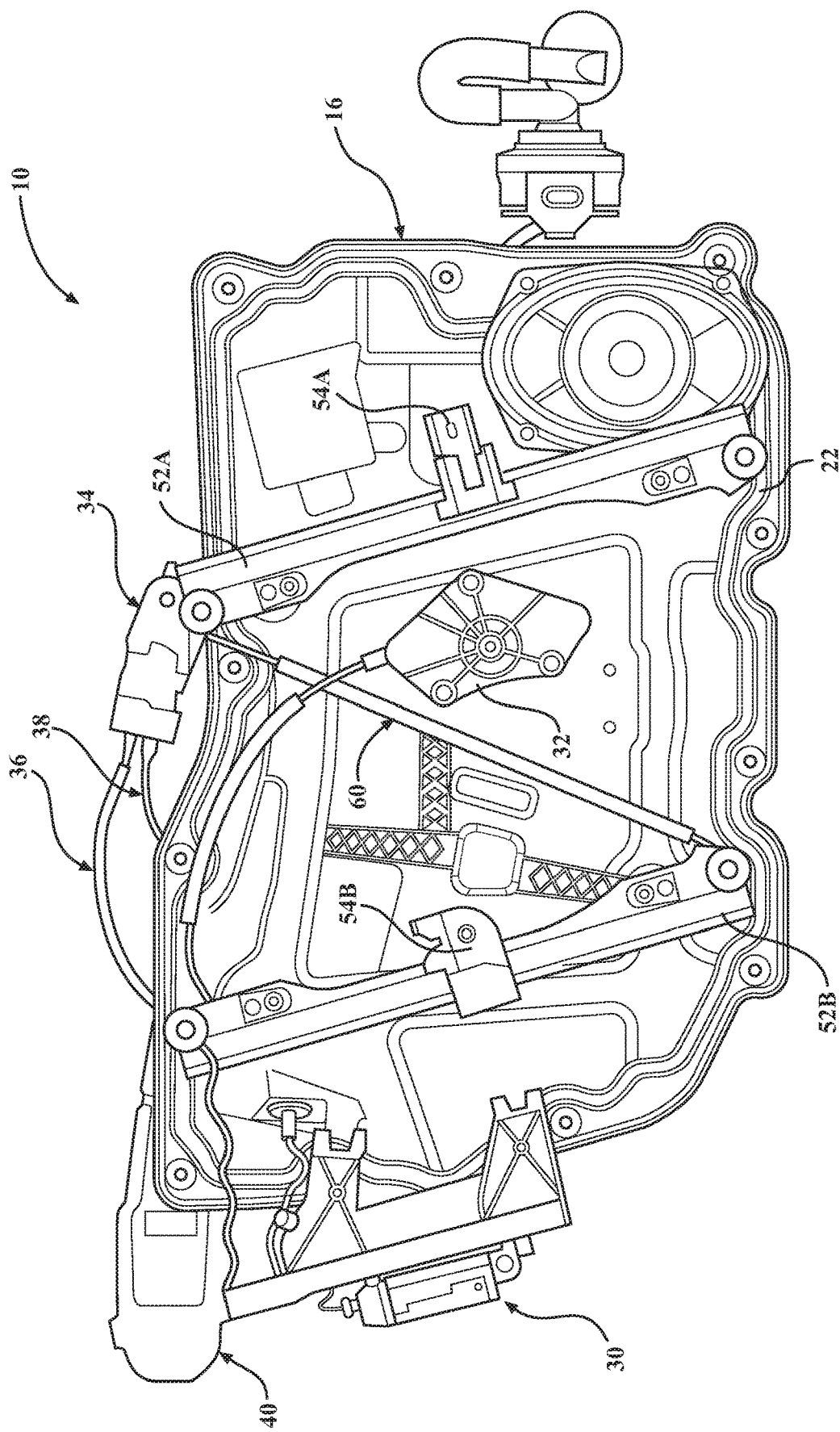
FIG. 2 is a plan view of a wet-side of a carrier assembly of a panel assembly of FIG. 1.
Figure 3:
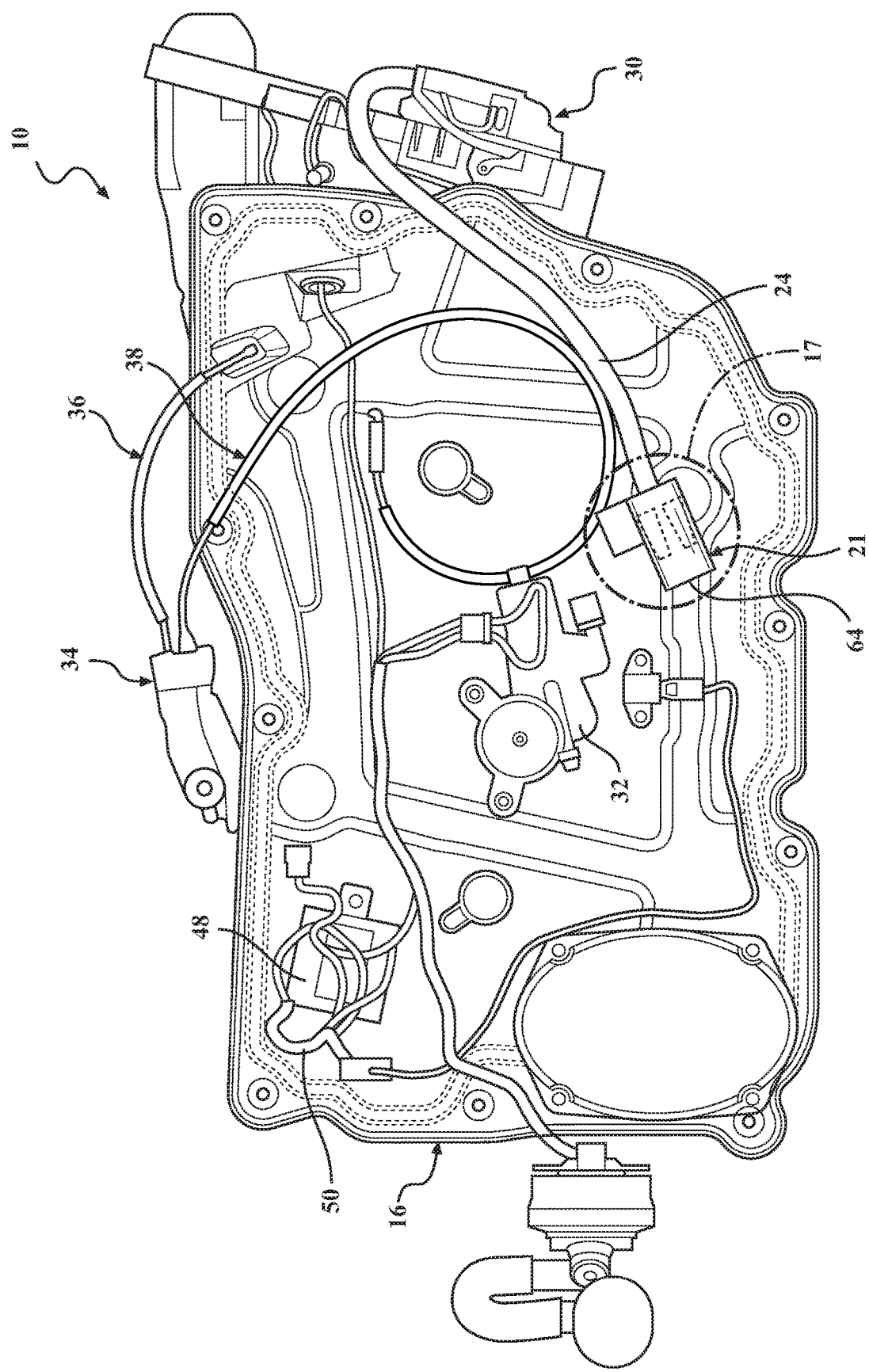
FIG. 3 is a plan view of a dry-side of the carrier assembly of FIG. 2 showing an actuator fixed thereto in accordance with another aspect of the disclosure with the actuator being operably coupled to a latch to selectively cinch the latch.
Figure 4:
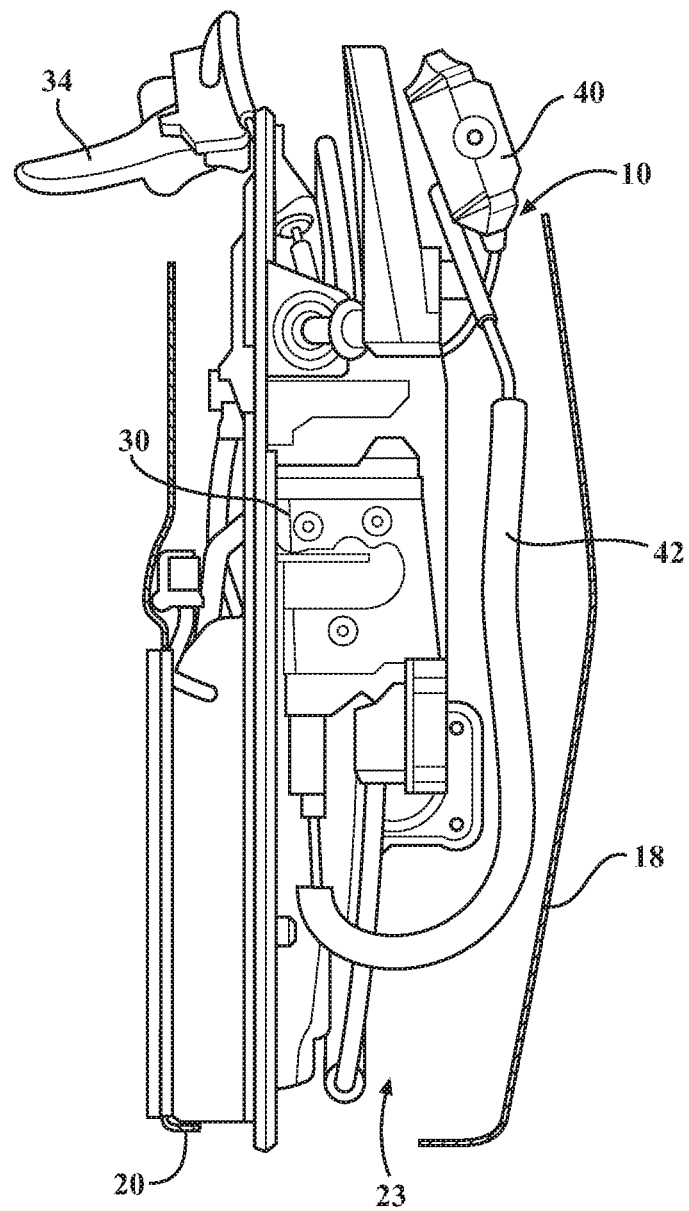
FIG. 4 is an end view of the carrier assembly of FIGS. 2 and 3 shown schematically fixed at least in part in an internal cavity of a panel assembly of FIG. 1.

FIG. 2 shows a first side (wet-side) of the carrier assembly 10 of one of the panel assemblies of FIG. 1, shown as one of the front door panel assemblies, referred to hereafter as front door 12, by way of example and without limitation. It is to be recognized that the carrier assembly 10 can be configured having any surface contours and outer peripheral shape as desired for application with any of the panel assemblies of FIG. 1, as well as for other applications, including, but not limited to deck lids and the like. FIG. 3 shows a second side (dry-side) of carrier assembly 10, and FIG. 4 shows a schematic end view of the carrier assembly 10. The first side of the carrier assembly 10 shown in FIG. 2 is referred to as the "wet-side" because, when the carrier assembly 10 is installed in a vehicle closure panel of vehicle 11, the first side faces outwardly, away from the passenger compartment, and may be exposed to the ambient external environment as a result of apertures in the panel assembly (such as the large slot through which a window 14 moves between open and closed positions). In contrast, the second side of the carrier assembly 10 shown in FIG. 3 is referred to as the "dry-side" because, when carrier assembly 10 is installed in a vehicle closure panel of vehicle, the carrier 16 of carrier assembly 10 seals the passenger compartment of the motor vehicle 11 against the ambient external environment such that the second side, which faces toward the passenger compartment, is protected from the external environment and remains dry.

Carrier assembly 10 is shown to include the carrier 16, which is generally plate-like in configuration, with undulating contours, also referred to as surface profiles, provided as desired for the intended application, thereby providing the carrier 16 having a variety of integrally formed three-dimensional features within the material of the carrier 16. Carrier 16 holds a variety of functional door hardware components. Carrier 16 is preferably a structural component in the sense that the door hardware components may be mounted thereto without requiring additional fasteners to mount the components to the structural panel assembly after installation of carrier assembly 10 therein. As is understood, front door 12 includes a structural door body made up of a sheet metal inner door panel 20 joined to a sheet metal outer door panel 18 along their outer peripheral edge regions and/or elsewhere so as to define an internal door cavity 23 between the inner and outer door panels 20, 18. Inner door panel 20 and outer door panel 18 are schematically shown in FIG. 4 via a silhouette line. Window 14 is stored in door cavity 23 when moved to its opened position. Inner door panel 20 typically includes an aperture (not shown) configured to provide access to internal door cavity 23 and which is ultimately covered via the trim panel. Carrier 16 includes a circumferential sealing bead 22 on the wet-side which is configured to surround the aperture in inner door panel 20 when carrier 16 is mounted against inner door panel 20. Since carrier 16 is impervious to water, the sealing bead 22 acts to prevent infiltration of moisture into the passenger cabin.

The carrier assembly 10 is shown carrying most, if not all, of the door hardware components for front door 12. Generally speaking, the functional hardware components secured to carrier 16 can, as shown, include the power-operated latch assembly 30, a power-operated window regulator 32, an inside handle unit 34 mechanically coupled to latch assembly 30 via an inside release mechanism 36 and via an inside lock/unlock mechanism 38, and an outside handle unit 40 mechanically coupled to latch assembly 30 via an outside release mechanism 42. The connector mechanisms can be Bowden cables and/or rod-links as is known. The functional hardware components are electrically coupled to an ECU 48 via a wiring harness 50. Carrier 16 further supports a pair of guide rails 52A, 52B which support corresponding lift brackets 54A, 54B for translational movement thereon. Lift brackets 54A, 54B support window 14 for movement along rails 52A, 52B between opened and closed positions. A cable and pulley-type window lift system 60 connects lift brackets 54A, 54B to a drum associated with power-operated window regulator 32.

Figure 5:
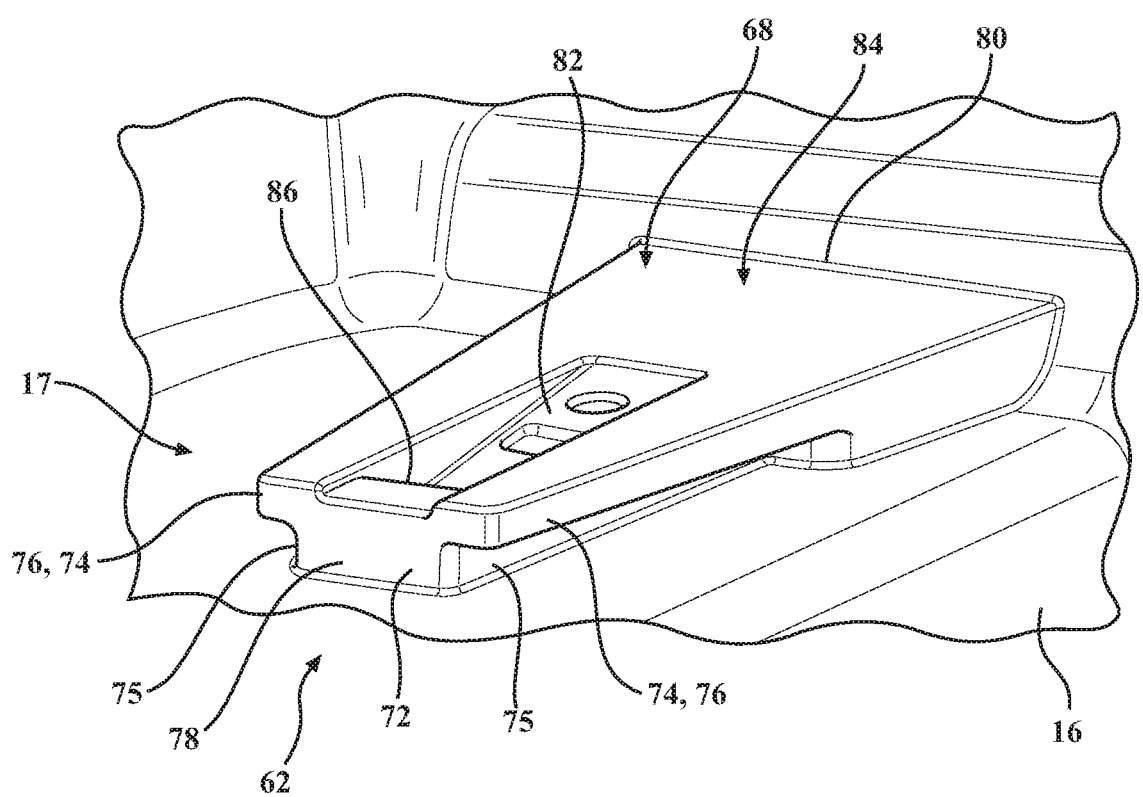
FIG. 5 is a partial perspective view of a carrier of the carrier assembly of FIGS. 2 and 3 showing a first attachment feature of the carrier in accordance with one aspect, wherein the first attachment feature is configured for releasably fixed attachment to the actuator.
Figure 6:
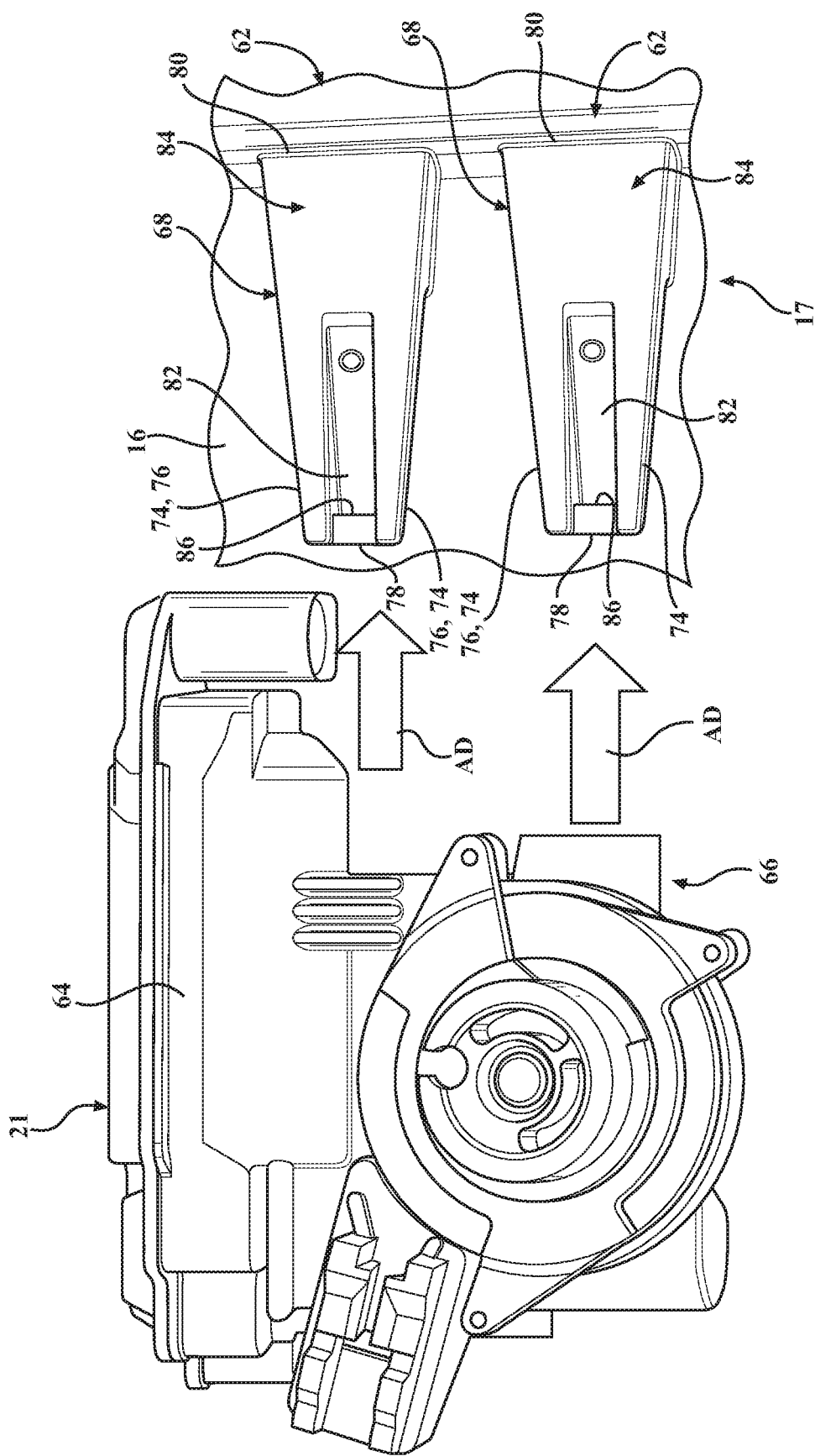
FIG. 6 is an exploded plan view of the first attachment feature of FIG. 5 shown aligned for sliding and snapping connection to a second attachment feature on a housing of the actuator in accordance with another aspect.
Figure 7:
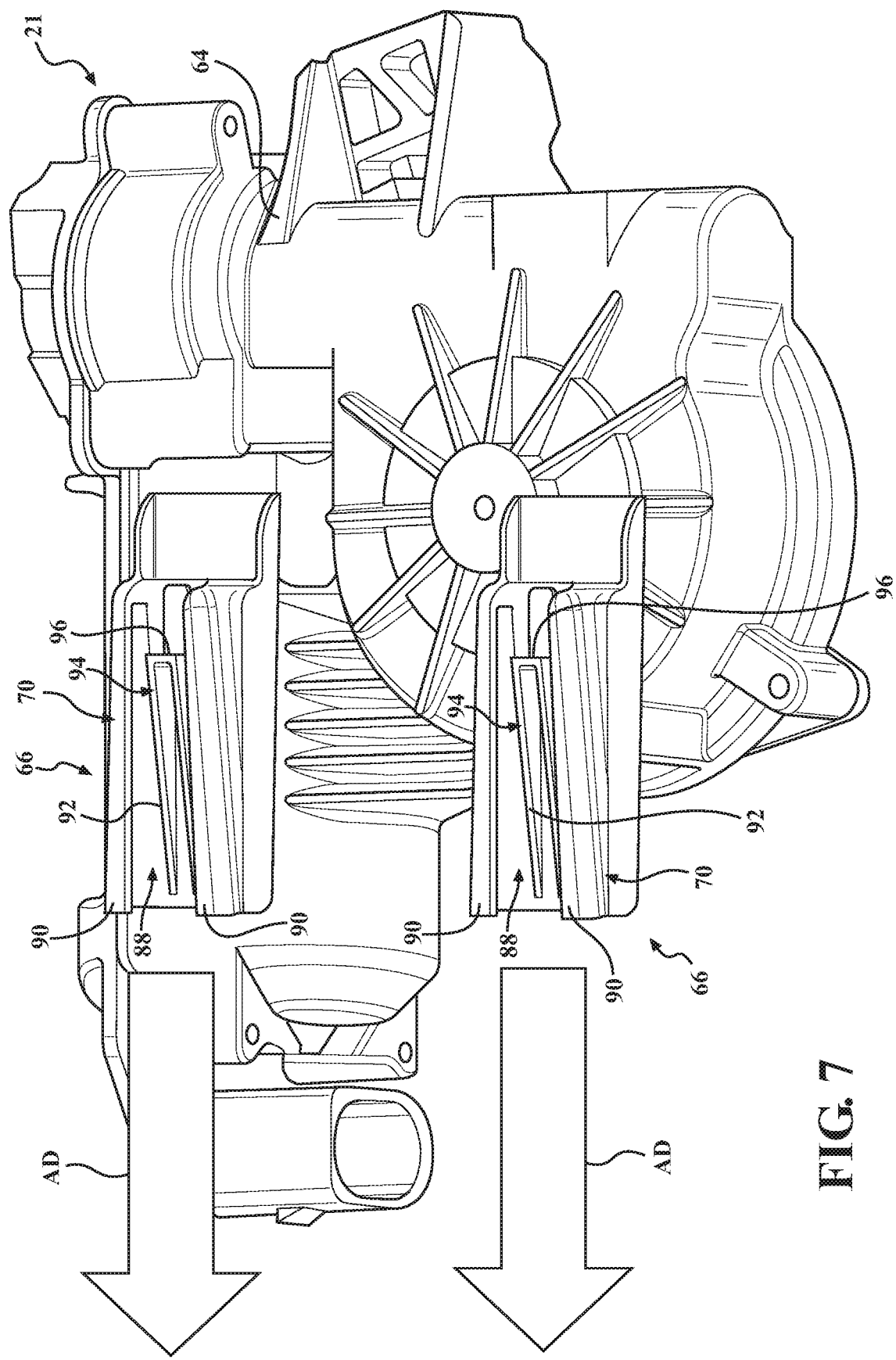
FIG. 7 is a bottom view of the actuator showing the second attachment feature of the housing.

As shown in FIGS. 5 and 6, the carrier 16 has at least one, and shown, by way of example and without limitation, as a pair of first attachment features 62, and the actuator has a housing 64 providing a corresponding number of second attachment features 66 (FIGS. 7-9) configured for releasably fixed attachment to one another. The first and second attachment features 62, 66 are configured for sliding, snapping engagement with one another. One of the first and second attachment features, and shown as the first attachment features 62, have male members 68 and the other of the first and second attachment features, shown as the second attachment features 66, have female members 70, wherein the male and female members 68, 70 are configured to slide into interlocking engagement with one another, and can be further configured for interlocking snapping engagement with one another.

The male members 68 are shown as extending outwardly from the carrier 16 and being formed as an integral, also referred to as monolithic piece of material with the carrier 16 (integral and monolithic piece of material, for purposes of this disclosure, are each intended to mean the male members 68 are not attached to the carrier 16 in a secondary operation, but rather, are formed in and by a single piece of material of the carrier 16), such as in a molding process, by way of example and without limitation, thereby being economical in construction and reducing the number of parts and processes needed for manufacture of carrier 16 and for assembly of carrier panel assembly 10. The male members 68 have a dovetail-like configuration, with a reduced width neck portion 72 (FIG. 5) extending immediately outwardly from the carrier 16 and opposite flanges 74 extending laterally outwardly from the neck portion 72, thereby forming recessed channels 75 beneath the flanges 74. Accordingly, the male members 68 are generally T-shaped as viewed in lateral cross-section. In addition, to facilitate assembly, the male members 68 have a lengthwise extending taper, with at least the flanges 74 having peripheral edges 76 that diverge away from one another along the length of the male members 68, from an insertion end 78 toward an opposite positive stop end 80, thereby acting as alignment surfaces during assembly. With the positive stop end 80 being wider than the insertion end 78, the positive stop end 80 provides a hard stop surface for the second attachment features 66 such that the second attachment feature 66 cannot be slid opposite a first direction, also referred to as an attachment direction AD, during sliding attachment completely past the first attachment feature 62, and thus, assembly is simplified by ensuring a proper connection is made quickly and easily.

To complete the releasable locking between the first attachment features 62 and the second attachment features 66, and to prevent the second attachment features 66 from being able to freely slide in a direction opposite the sliding attachment direction AD, the first attachment features 62 are provided with recessed pockets, also referred to as receptacles 82, depending into their uppermost, generally planar surfaces 84. The receptacles 82 are configured, by way of example and without limitation, as having a maximum depth defined by a generally first square shoulder 86 at their entry end proximate the insertion end 78 and tapering gradually upwardly to the planar surfaces 84 away from the insertion end 78.

Figure 8:
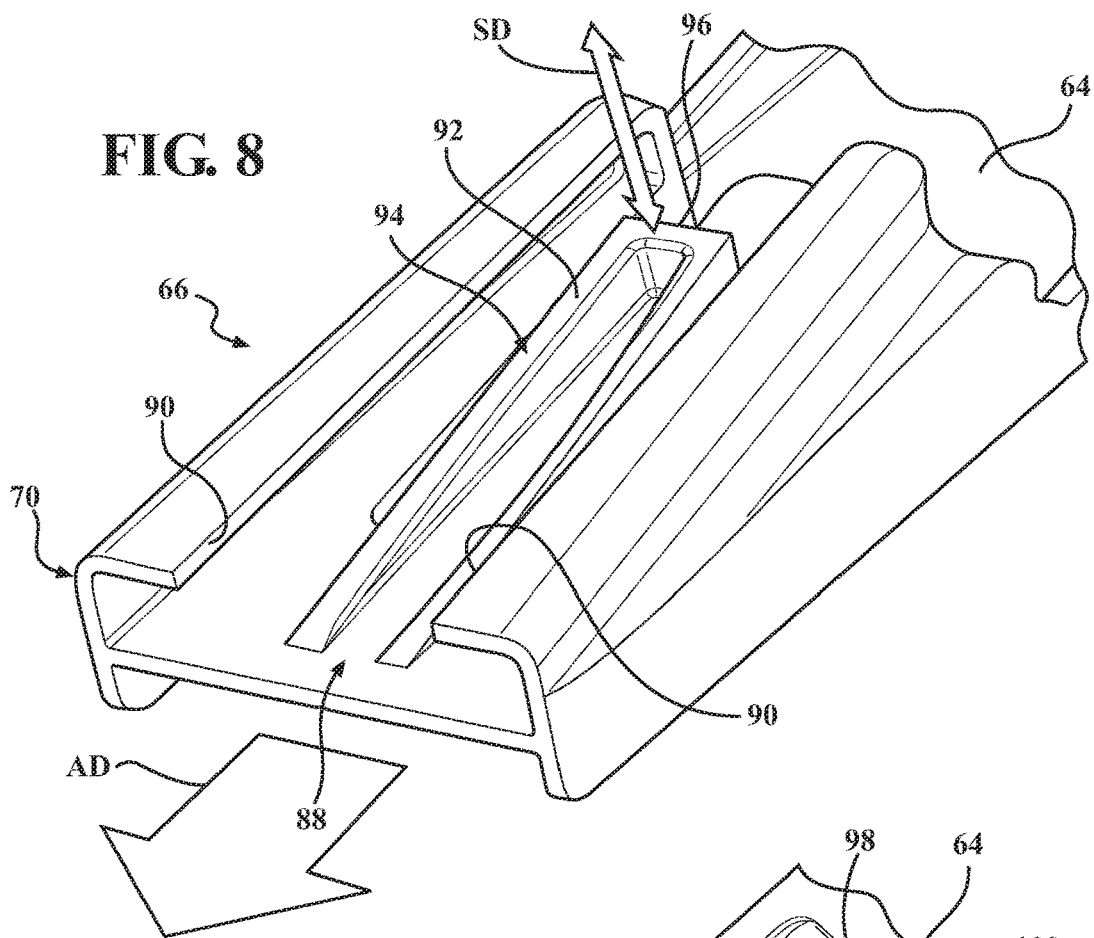
FIG. 8 is a partial perspective view of the actuator housing showing a bottom side of the second attachment feature.
Figure 9:
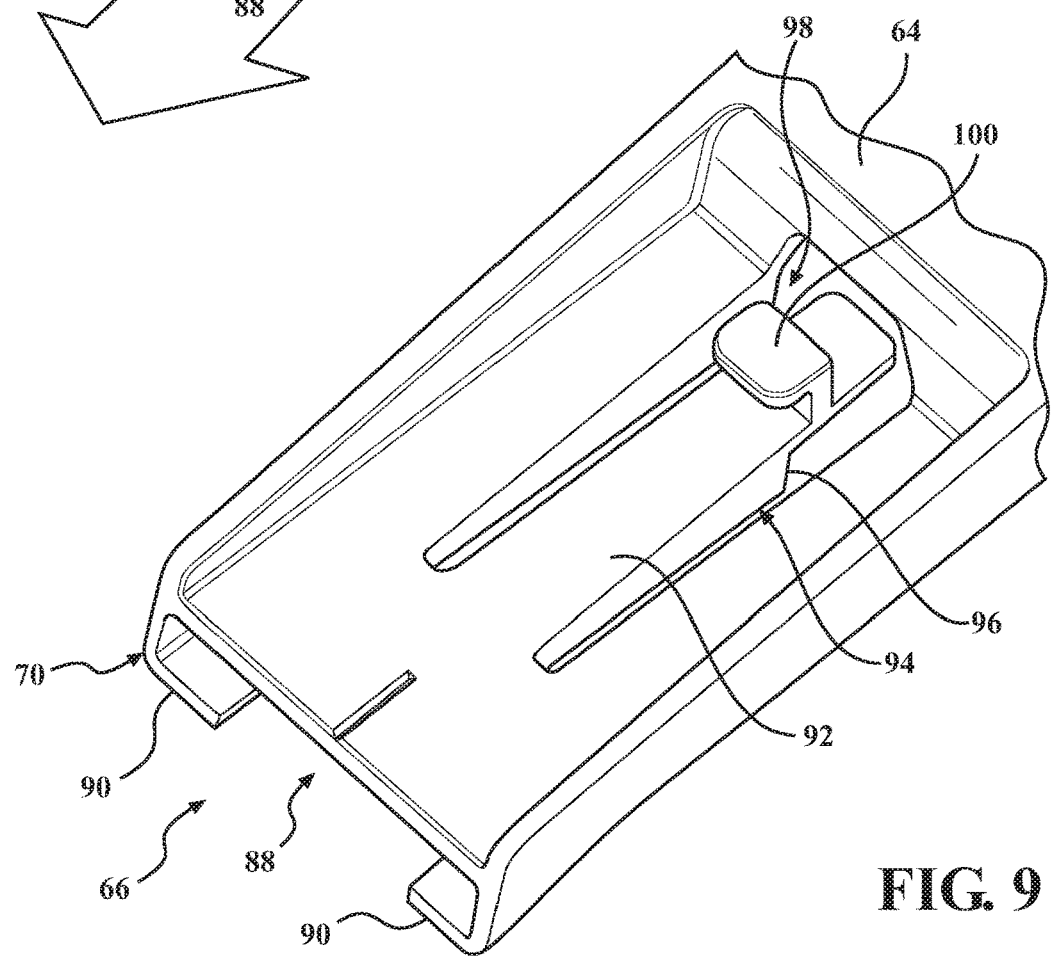
FIG. 9 is a partial perspective view of the actuator housing showing a top side of the second attachment feature.

The second attachment features 66 are preferably formed as a monolithic piece of material (same meaning as discussed above) with the actuator housing 64, such as in a molding process, by way of example and without limitation, thereby being economical in construction and further reducing the number of parts and processes needed to attach the actuator 21 to the carrier 16. As best shown in FIGS. 8 and 9, the female members 70 provide a receptacle, referred to hereafter as a channel or slot 88 formed in part by generally C-shaped flanges 90, as viewed in lateral cross-section, with the C-shaped flanges 90 opening in facing relation toward one another. The slots 88 are shaped and sized to receive the male members 68 in sliding relation therein, with a resulting snug fit, such as line-to-line or slight interference fit therein, thereby preventing noise and vibration therebetween. Accordingly, the slots 88 have a hollowed, tapered configuration to substantially match the tapered configuration of the flanges 74 of the male members 68, thereby acting as alignment surfaces with the peripheral edges 76 during assembly. Further, to provide a snapping, releasable locked connection between the first and second attachment features 62, 66, the second attachment features 66 include a resilient, cantilevered tongue 92 configured for resilient pivoting movement along a second direction SD generally transverse to the assembly direction AD (FIG. 8). The cantilevered tongue 92 is shaped and sized to fit closely for snapping receipt in the receptacle 82 of the first attachment features 62, such as in a slightly loose fit. Accordingly, the tongues 92 have a matching tapered surface 94 to that of the receptacles 82, and have a second shoulder 96 configured to confront and abut a corresponding first shoulder 86 when disposed in the receptacle 82, thereby preventing relative sliding movement between the male and female members, particularly in the direction opposite and attachment direction AD. However, it may be desired to decouple the actuator 21 subsequent to attachment, and thus, a release mechanism 98 is provided to allow for selective, intended detachment. The release mechanism 98 includes a tab 100 facing oppositely from the tapered surface 94, extending upwardly away therefrom and shown extending directly opposite the second shoulder 96. As such, when desired, the tab 100 of the release mechanism 98 can be selectively lifted in the second direction SD to raise the second shoulder 96 upwardly and outwardly from the receptacle 82 and out of confronting relation with the first shoulder 86, whereupon the actuator 21 can be slid opposite the attachment direction AD to remove the actuator 21 from the carrier 16, such as may be desired in service, by way of example and without limitation. However, it is to be recognized that the actuator 21, upon being attached to the carrier 16, can be fixed against removal from the carrier 16, if desired. Accordingly, if desired, the actuator 21 can be configured for permanent attachment to the carrier 16.

In summary, the first and second attachment features 62, 66 provide a simple, economical and reliable mechanism in which to releasably attach the actuator 21 to the carrier 16. Further yet, without having to form any openings in the carrier 16 to attach the actuator 21 thereto, the connection therebetween is made watertight and leak proof. Further yet, with the first and second attachment features 62, 66 being integral to their respective components, namely, the carrier 16 and actuator 21, no inventory of secondary fastening mechanisms is needed, thereby further simplifying assembly and reducing the cost associated therewith. These, among other benefits will be readily appreciated by those skilled in the art of vehicle closure panel assemblies upon viewing the disclosure herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle door carrier module for a motor vehicle having a structural door panel body defining an internal cavity configured for receipt of the vehicle door carrier module at least in part therein, the vehicle door carrier module comprising:
    a carrier with an actuator attachment region formed integrally thereon, the actuator attachment region providing a first attachment feature;
    a latch assembly; and
    an actuator configured in operable communication with the latch assembly to selectively cinch the latch assembly, the actuator having a housing providing a second attachment feature, wherein the first and second attachment features are configured for attachment to one another.

2. The vehicle door carrier module of claim 1, wherein the carrier and first attachment feature are a molded piece of monolithic material.

3. The vehicle door carrier module of claim 1, wherein the second attachment feature is integrally formed on the housing.

4. The vehicle door carrier module of claim 1, wherein the first and second attachment features are configured to be selectively released from one another.

5. The vehicle door carrier module of claim 4, wherein the first and second attachment features are configured for snapping engagement with one another.

6. The vehicle door carrier module of claim 1, wherein one of the first and second attachment features has a male member and the other of the first and second attachment features has a female member, the male and female members being configured to slide into snapping engagement with one another.

7. The vehicle door carrier module of claim 6, wherein the male member and the female member are provided with alignment surfaces along their lengths to facilitate sliding engagement with one another, the alignment surfaces being correspondingly tapered along their lengths.

8. The vehicle door carrier module of claim 6, wherein the male member has a receptacle and the female member has a resilient tongue, wherein the resilient tongue is configured for snapping receipt in the receptacle to prevent relative sliding movement between the male and female members.

9. The vehicle door carrier module of claim 8, wherein the male and female members are configured for sliding movement relative to one another along a first direction and the resilient tongue is configured for resilient pivoting movement along a second direction, wherein the first and second directions are generally transverse to one another, and wherein the resilient tongue is configured to be selectively pivoted to release the male and females members from one another.

10. The vehicle door carrier module of claim 1, wherein the carrier has at least two first attachment features and the housing has at least two second attachment features, wherein each of the at least two first attachment features are configured for attachment with an associated one of the at least two second attachment features.

11. A vehicle panel assembly for a motor vehicle, comprising:
    an outer door panel and an inner door panel defining an internal cavity;
    a carrier assembly secured at least in part in the internal cavity, the carrier assembly having a carrier with an actuator attachment region formed integrally thereon, the actuator attachment region providing a first attachment feature;
    a latch assembly secured to the carrier assembly; and
    an actuator configured in operable communication with the latch assembly to selectively cinch the latch assembly, the actuator having a housing providing a second attachment feature, wherein the first and second attachment features are configured for attachment to one another.

12. The vehicle panel assembly of claim 11, wherein the first and second attachment features interlock with one another and prevent relative movement and vibration between the carrier and the housing.

13. The vehicle panel assembly of claim 11, wherein the second attachment features is integrally formed on the housing.

14. The vehicle panel assembly of claim 11, wherein the first and second attachment features are configured to be selectively released from one another.

15. The vehicle panel assembly of claim 14, wherein the first and second attachment features are configured for snapping engagement with one another.

16. The vehicle panel assembly of claim 11, wherein one of the first and second attachment features has a male member and the other of the first and second attachment features has a female member, the male and female members being configured to slide into snapping engagement with one another.

17. The vehicle panel assembly of claim 16, wherein the male member and the female member are provided with alignment surfaces along their lengths to facilitate sliding engagement with one another, the alignment surfaces being correspondingly tapered along their lengths.

18. The vehicle panel assembly of claim 16, wherein the male member has a receptacle and the female member has a resilient tongue, wherein the resilient tongue is configured for snapping receipt in the receptacle to prevent relative sliding movement between the male and female members.

19. The vehicle panel assembly of claim 18, wherein the male and female members are configured for sliding movement relative to one another along a first direction and the resilient tongue is configured for resilient pivoting movement along a second direction, wherein the first and second directions are generally transverse to one another, and wherein the resilient tongue is configured to be selectively pivoted to release the male and females members from one another.

20. The vehicle panel assembly of claim 11, wherein the housing has at least two second attachment features and the carrier has at least two first attachment features, wherein each of the at least two first attachment features are configured for attachment with an associated one of the at least two second attachment features.

* * * * *